UNITED STATES PATENT OFFICE 2,433,489

PRODUCTION OF AMIDINES

Wallace Frank Short and Peter Oxley, Nottingham, England, assignors to Boots Pure Drug Company Limited, Nottingham, England, a company of Great Britain No Drawing. Application December 13, 1944, Serial No. 568,070. In Great Britain January 27, 1944

6 Claims. (Cl. 260—501)

This invention relates to the production of amidines and its main object is to provide a new method for the production of this class of compound which is generally applicable.

Several methods have already been used for the production of amidines, including a process in which a nitrile is converted into an imino-ether hydrochloride by the action of an anhydrous alcohol solution of hydrogen chloride and then the imino-ether hydrochloride is caused to react with ammonia.

The process in accordance with the present invention, consists in forming amidines as their sulphonic acid salts by the action of ammonium salts of sulphonic acids on nitriles at an elevated temperature:

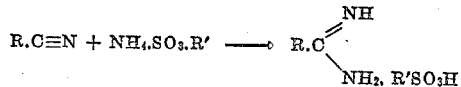

The sulphonic acids of which the ammonium salts ($R'.SO_3NH_4$) are used may be such that $R'$ is either an alkyl, aralkyl, or aryl group. The nitriles (R.CN) which may be used in carrying out the process in accordance with the invention may be such that R may be a substituted or unsubstituted alkyl, aralkyl, aryl or heterocyclic group and, if the boiling point of the nitrile employed is not sufficiently high to enable the reaction to be carried out under atmospheric pressure, the reacting substances may be heated to the requisite temperature in a closed vessel. Furthermore, substances which may be regarded as potential sources of nitriles under the conditions of the reaction, for example, carboxylic amides may be used in the reaction.

Instead of ammonium salts of sulphonic acids, salts of primary mono amines and secondary arylamines with sulphonic acids may be used resulting in the formation of mono- or di-N-substituted amidines. Where it is convenient the salts need not be preformed but a mixture of an amine and a sulphonic acid may be used in the reaction.

The amidine salts resulting from the reaction may, of course, be converted into other amidine salts by the usual methods.

In order that the nature of the invention may be more clearly explained and, in order to illustrate the wide range of application of the invention, a number of examples will now be given of methods of carrying out the invention but even these examples are merely by way of illustration. Many of the amidines which may be produced in the above manner have application in chemotherapy.

Example 1

In the manufacture of p-sulphonamidobenzamidine $p-NH_2 SO_2.C_6H_4.C(:NH).NH_2$, 50 gms. of p-sulphonamidobenzonitrile is melted and heated to about 200° C. with gentle stirring, to prevent local overheating. 70 gms., that is 1.46 molecules, of dry ammonium benzenesulphonate is then added as rapidly as it will dissolve and during this operation which takes about 5 minutes, the temperature of the melt is raised to 250° C. The temperature is maintained at 250 to 255° C. for two hours and the resulting brown liquid is then allowed to solidify and it is then dissolved in 300 c. c. of hot water. The solution is cooled to room temperature, stirred with 1 gm. of decolourising charcoal and filtered. The filtrate is warmed to about 40° C. and an excess of 0.880 ammonia—25 c. c. or about 1.55 molecules—is added to precipitate p-sulphonamidobenzamidine in a crystalline, easily filterable form. The product is collected with suction, washed thoroughly with water and dried, when it melts at about 215° C. It may be converted immediately into a salt, such as the hydrochloride by solution in the appropriate acid.

The ammoniacal liquor (containing ammonium benzenesulfonate) from which the amidine has been removed may be evaporated to constant weight and used to react with a second amount of 50 gms. of nitrile.

The process of recovering the ammonium benzenesulphonate and using it with further nitrile may be repeated.

In variants of the above example, other ammonium sulphonates instead of ammonium benzenesulphonate are caused to react with p-sulphamidobenzonitrile. Thus ammonium toluene-p-sulphonate, ammonium-m-nitrobenzenesulphonate, ammonium naphthalene-β-sulphonate or ammonium methanesulphonate may be used under similar conditions and the products isolated as described in the above example.

The following are examples of processes according to the invention, in which other nitriles are employed.

Example 2

In the preparation of N-(p-sulphonamidophenly)-benzamidine 2 parts by weight of benzonitrile, 3.4 parts by weight of sulphanilamide and 3.5 parts by weight of benzenesulphonic acid are heated together at 230° C. for 10 minutes. After cooling, the product is dissolved in aqueous-alcohol and the precipitate formed on addition of ammonia is separated and crystallised from alcohol, yielding crystals with a melting point of 241–242° C. (Found, N, 15.4% $C_{13}H_{13}O_2N_3S$ requires N, 15.27%).

Example 3

In the manufacture of benzamidine-p-sulphonic acid, ammonium p-cyanobenzenesulphonate is heated alone at a temperature of about 310° C. for about an hour. In this case, the single starting material contains both the necessary functional groups. The product is isolated by recrystallisation from water.

Example 4

In the preparation of benzamidine benzenesulphonate, 10 parts by weight of benzonitrile and 17 parts by weight of ammonium benzenesulphonate are heated together in a sealed tube at 250° C. for two hours. The product is cooled and recrystallised from water, yielding colourless crystals of benzamidine benzenesulphonate, with a melting point of 175–175.5° C.

Example 5

In the preparation of o-nitrobenzamidine benzenesulphonate 2.2 parts by weight of o-nitrobenzonitrile and 5 parts by weight of ammonium benzenesulphonate are heated together at 250° C. for 2½ hours. By crystallisation of the product from water o-nitrobenzamidine benzenesulphonate is obtained in crystals with a melting point of 213.5° C. (Found N, 13.2% $C_{13}H_{13}O_5N_3S$ requires N, 13.0%.)

m-Nitro or p-nitro-benzamidinebenzenesulphonates may be obtained by the use of m-nitro or p-nitrobenzonitrile in a similar manner.

Example 6

In the preparation of undecane—1:11-diamidine picrate, 2 parts by weight of 1:11-dicyano-undecane and 7 parts by weight of ammonium benzenesulphonate are heated together at 260° C. for three hours. The product is cooled, dissolved in alcohol, and mixed with a solution of picric acid and thus converted to the picrate which separates. After recrystallisation from methyl alcohol it melts at 192° C.

Example 7

In the preparation of 4-amidino-4'-cyano-α:β-diphenoxy-ethane benzenesulphonate, 5.28 parts by weight of 4:4'-dicyano-α:β diphenoxyethane and 3.50 parts by weight of ammonium benzenesulphonate are heated together at 260° C. for 2 hours. After crystallisation from water 4 - amidino-4'-cyano-α:β-diphenoxyethane benzenesulphonate is obtained in crystals with a melting point of 239° C. The picrate obtained therefrom has a melting point of 202° C. (Found N, 16.44% $C_{22}H_{18}O_9N_6$ requires N, 16.47%.

Example 8

In the preparation of 4:4'-diamidino-α:β diphenoxyethane benzenesulphonate 5.28 parts by weight of 4:4'-dicyano-α:β-diphenoxyethane and 10.5 parts by weight of ammonium benzenesulphonate are heated together at 260° for 3 hours. The product is crystallised from water.

Example 9

In the preparation of p-amidinophenyl methyl sulphone hydrochloride 18.1 parts by weight of p-cyanophenyl methyl sulphone and 21 parts by weight of ammonium benzenesulphonate are heated together at 260° C. for 1 hour. After cooling, the product is dissolved in hot water and the solution is filtered, cooled to ca. 60° C. and then poured into a stirred mixture of sodium hydroxide solution and ice. The solid product which separates is filtered off and dissolved in dilute hydrochloric acid. The solution is filtered and cooled while excess sodium hydroxide solution is added. The p-amidinophenyl methyl sulphone which is precipitated is filtered off and dissolved in dilute hydrochloride acid so that the pH of the solution is 6.5–7.0. The solution is then evaporated to dryness and p-amidinophenyl methyl sulphone hydrochloride is obtained.

Example 10

In the preparation of p-amidinophenyl ethyl sulphone hydrochloride 5 parts by weight of p-cyanophenyl ethyl sulphone and 5 parts by weight of ammonium benzenesulphonate are heated together at 225° C. for 4 hours. The product is isolated as described in Example 9 and p-amidinophenyl ethyl sulphone hydrochloride is obtained in crystals with a melting point of 253° C. (Found N, 11.45% $C_9H_{13}O_2N_2SCl$ requires N, 11.3%.)

Example 11

In the preparation of p-amidinodiphenyl sulphone benzenesulphonate 50 parts by weight of p-cyanodiphenyl sulphone and 44 parts by weight of ammonium benzenesulphonate are heated together at 260–270° C. for 1¾ hours. From the product p-amidinodiphenyl sulphone benzenesulphonate is isolated by crystallisation from water.

Example 12

In the preparation of pp'-diamidinodiphenylsulphone dihydrochloride 5 parts by weight of pp'-dicyanodiphenylsulphone and 15 parts by weight of ammonium benzenesulphonate are heated together at 270° C. for 1 hour. The product is isolated as described in Example 9 and pp'-diamidinodiphenylsulphone dihydrochloride is obtained in crystals with a melting point of 300–302° C.

Example 13

In the preparation of α-naphthamidine benzenesulphonate 3.1 parts by weight of α-naphthonitrile and 6.0 parts by weight of ammonium benzenesulphonate are heated together at 260–270° C. for 2 hours. By crystallisation of the product from water α-naphthamidine benzenesulphonate is obtained in crystals with a melting point of 210°–211° C. (Found N, 8.7% $C_{17}H_{16}O_3N_2S$ requires N 8.54%.) From this material α-naphthamidine may be obtained in crystals with a melting point of 153–154° C.

Example 14

In the preparation of β-naphthamidine benzenesulphonate, 2 parts by weight of β-naphthonitrile and 5 parts by weight of ammonium benzenesulphonate are heated together at 250° C. for two hours. The product is cooled and crystallised from water, in the form of colourless crystals melting at 203° C. The free amidine having a melting point of 136° C. crystallises from an alcoholic solution of the benzenesulphonate on adding the theoretical amount of aqueous sodium hydroxide.

Example 15

In the preparation of α-amidinopyridine 5.2 parts by weight of α-cyanopyridine and 12 parts by weight of ammonium benzenesulphonate are heated together at 265–270° C. for 1¼ hours. After cooling, the product is extracted with water, charcoaled and the aqueous extract is evaporated to dryness. The residue is crystallised from isopropyl alcohol yielding crystals of α-amidinopyridine benzenesulphonate with a melting point of 145° C. (Found N, 15.2% $C_{12}H_{13}O_3N_3S$ requires N, 15.06%.)

The following are examples of the production of N-substituted amidines.

Example 16

In the preparation of N-p-tolylbenzamidine benzenesulphonate, a mixture of 2 parts by weight of benzonitrile and 5.3 parts by weight, or 1 molecule, of p-toluidine benzenesulphonate is heated in a bath at 240° C. until the internal temperature of the mixture rises to 240° C. The product is then cooled and crystallised from water. In this and the next example, the free amidine may be prepared by adding aqueous ammonia to an aqueous or alcoholic solution of the benzenesulphonate.

If in this example, p-toluidine benzenesulphonate is replaced by the corresponding amount of aniline benzenesulphonate, N-phenyl benzamidine benzenesulphonate is obtained.

Example 17

In the preparation of NN'-di-p-tolylbenzamidine benzenesulphonate, a mixture of 2 parts by weight of benzonitrile and 11 parts by weight, or 2 molecules, of p-toluidine benzenesulphonate is heated at 270° C. for one hour. The product is then crystallised from water and melts at 217° C. The mother liquor contains a trace of N-p-tolylbenzamidine benzenesulphonate.

If in this example also, p-toluidine benzenesulphonate is replaced by the corresponding amount of aniline benzenesulphonate, NN'-diphenyl benzamidine benzenesulphonate is obtained.

Example 18

In the preparation of N-p-nitrophenylbenzamidine benzenesulphonate, 6 parts by weight of p-nitraniline benzenesulphonate and 2 parts by weight of benzonitrile are heated together at 200° C. for ten minutes and the product recrystallised from water when N-p-nitrophenylbenzamidine benzenesulphonate separates in orange crystals. From these p-nitrophenylbenzamidine with a melting point of 167° C. may be obtained.

Example 19

In the preparation of N-p-tolylphenylacetamidine benzenesulphonate, 2 parts by weight of benzyl cyanide ($C_6H_5.CH_2.CN$) and 6 parts by weight of p-toluidine benzenesulphonate, are heated together as described in Example 16 after which the cooled product is recrystallised from water.

Example 20

In the preparation of N-methyl-phenylacetamidine reineckate 8 parts by weight of benzyl cyanide and 14 parts by weight of methylamine benzenesulphonate are heated together at 265–270° C. for 2 hours. After cooling the product is dissolved in water, excess sodium hydroxide solution is added with cooling, and the mixture is extracted with chloroform. The basic product is removed from the chloroform solution by extraction with dilute hydrochloric acid and this acid solution is then made alkaline with sodium hydroxide solution with cooling, and extracted with chloroform. After evaporation of the chloroform the residue is dissolved in dilute acetic acid and N-methylphenylacetamidine reineckate is precipitated by adding a solution of ammonium reineckate, in crystalline form with a melting point of 134° C. (Found SCN, 49.66%. $C_{13}H_{19}N_8S_4Cr$ requires SCN, 49.68%.)

Example 21

In the preparation of N-benzylphenylacetamidine 6 parts by weight of benzyl cyanide and 15 parts by weight of benzylamine benzenesulphonate are heated together at 265°–270° C. for two hours. After cooling the product is dissolved in water, excess 5N sodium hydroxide solution is added with cooling and the mixture is extracted with chloroform. The basic product is removed from the chloroform solution by extraction with dilute hydrochloric acid and this acid solution is then made alkaline with sodium hydroxide solution with cooling, and extracted with chloroform. The residue after evaporation of the chloroform is crystallised from light petroleum and N-benzylphenylacetamidine is obtained in crystals with a melting point of 93° C.

Example 22

In the preparation of N:N-diphenylbenzamidine benzenesulphonate, 2 parts by weight of benzonitrile, 3.4 parts by weight of diphenylamine, and 3.2 parts by weight of benzenesulphonic acid (the two latter compounds being in approximately equivalent amounts), are heated together at 210° C. for twenty minutes. The product is cooled, triturated with acetone to remove any unreacted diphenylamine, and the residue recrystallised from water.

The following is an example of a process according to the invention in which a carboxylic amide is used.

Example 23

In the preparation of benzamidine 3.6 parts by weight of benzamide and 5.3 parts by weight of ammonium benzenesulphonate are heated together at 250° C. for three hours. The product is then cooled and extracted with water to separate the benzamidine salt from unchanged benzamide. The benzamidine is isolated from the mother liquor as trichloracetate, which melts at 126° C.

We claim:
1. In a process for the conversion of a nitrile of the general formula R.CN, where R is a member of the class consisting of alkyl, aralkyl, aryl and heterocyclic radicals, into an amidine compound the step which consists in heating the said nitrile at a temperature of at least about 200° C. with a sulphonic acid salt derived from a base selected from the class consisting of ammonia, primary amines and secondary arylamines and a sulphonic acid selected from the class consisting of aliphatic, araliphatic and aromatic sulphonic acids.
2. Process as defined in claim 1 in which the nitrile is a sulfonamidobenzonitrile.
3. Process as defined in claim 1 in which the sulfonic acid salt is ammonium benzene sulfonate.
4. Process as defined in claim 1 in which a substance capable of yielding the nitrile is supplied to the reaction mixture.
5. Process as defined in claim 1 in which a substance capable of yielding the sulfonic acid salt is supplied to the reaction mixture.

6. Process as defined in claim 1 in which a single substance containing both the nitrile and the sulfonic acid groups is supplied to the reaction mixture.

WALLACE FRANK SHORT.
PETER OXLEY.

REFERENCES CITED

The following references are of record in the file of this patent:

UNITED STATES PATENTS

| Number | Name | Date |
|---|---|---|
| 1,693,055 | Schoeller | Nov. 27, 1928 |
| 2,255,090 | Tinker et al. | Sept. 9, 1941 |
| 2,277,861 | Ewins et al. | Mar. 31, 1942 |
| 2,375,611 | Barber et al. | May 8, 1945 |

FOREIGN PATENTS

| Number | Country | Date |
|---|---|---|
| 507,565 | Great Britain | June 12, 1939 |

OTHER REFERENCES

Fulton et al., Annals Tropical Med. and Parasitology, vol. 36, pages 131–133 (1942).

Shriner et al., Chem. Reviews, vol. 35, No. 3, pages 360, 363, 373 (1944) (abstracts of articles of earlier date).

Evans et al., Lancet, Oct. 21, 1944, pages 523, 524.